United States Patent [19]

Barlas et al.

[11] Patent Number: 5,785,345

[45] Date of Patent: Jul. 28, 1998

[54] MEANS FOR AND METHOD OF CONTROLLING FRAME RISE IN VEHICLE SUSPENSIONS

[75] Inventors: Serge Alexander Barlas, St. Charles; Michael Brannigan, Chicago; Jonathan Mark Bunne, Aurora; David Harry Hillman, Darien; Tjong Thiam Lie, Naperville, all of Ill.

[73] Assignee: The Boler Company, Itasca, Ill.

[21] Appl. No.: 543,264

[22] Filed: Oct. 16, 1995

[51] Int. Cl.$^6$ ................................................ B60G 11/28
[52] U.S. Cl. ......................... 280/715; 280/713; 280/711
[58] Field of Search ................................. 280/702, 711, 280/709, 710, 712, 713, 715, 660, 662, 672, 699; 267/31

[56] References Cited

U.S. PATENT DOCUMENTS

| | | |
|---|---|---|
| 2,639,141 | 5/1953 | Gabriel . |
| 2,985,319 | 5/1961 | Simmons . |
| 3,070,363 | 12/1962 | Ellis, Jr. . |
| 3,111,201 | 11/1963 | Bliven et al. . |
| 3,504,901 | 4/1970 | Ditty . |
| 3,537,696 | 11/1970 | Webster, Jr. . |
| 3,823,833 | 7/1974 | Chung . |
| 3,929,729 | 12/1975 | Chung . |
| 3,960,388 | 6/1976 | Strader et al. ................ 280/672 X |
| 3,990,687 | 11/1976 | Curnutt . |
| 4,309,045 | 1/1982 | Raidel ................................. 282/74 |
| 4,312,499 | 1/1982 | Wossner et al. . |
| 4,328,960 | 5/1982 | Handke et al. . |
| 4,345,748 | 8/1982 | Wossner et al. . |
| 4,465,299 | 8/1984 | Stone et al. . |
| 4,527,674 | 7/1985 | Mourray . |
| 4,541,653 | 9/1985 | Raidel ................................. 280/711 |
| 4,705,294 | 11/1987 | Raidel ................................. 280/711 |

(List continued on next page.)

FOREIGN PATENT DOCUMENTS

| | | |
|---|---|---|
| 3729792A1 | 6/1906 | Germany . |
| 1058855 | 1/1958 | Germany . |
| 172708 | 3/1963 | Germany . |
| 2100048A1 | 3/1989 | Germany . |
| 3923266A1 | 1/1990 | Germany . |
| 1871882 | 1/1992 | Germany . |
| 4334369A1 | 4/1995 | Germany . |
| 773828 | 5/1957 | United Kingdom . |
| 1145419 | 3/1967 | United Kingdom . |
| 1117587 | 6/1968 | United Kingdom . |
| 2192843 | 7/1972 | United Kingdom . |
| 1363619 | 8/1974 | United Kingdom . |

Primary Examiner—Christopher P. Ellis
Attorney, Agent, or Firm—Lockwood, Alex, FitzGibbon & Cummings

[57] ABSTRACT

Vehicles, notably heavy duty trucks, equipped with torque reactive suspensions, such as trailing arm air suspensions, are susceptible to driveline vibration and wheel hop due to engine produced torque. According to this invention such driveline vibration and wheel hop can be suppressed by preventing frame rise from occurring. Suppression can be accomplished by providing one of several forms of frame rise control means operative between the vehicle drive axle and the vehicle frame. One form of frame rise control means utilizes rebound control leaf springs on opposite sides of a vehicle. Another form utilizes shock absorbers each of which incorporates a spring mounted on the piston rod. Another form utilizes hydraulic cylinders, each having a source of pressurized hydraulic fluid connected to the chamber of the cylinder on the rebound side of the piston and the chamber on the opposite side of the piston vented to atmosphere. Another form utilizes hydraulic cylinders each having a source of hydraulic fluid connected to the chambers on opposite sides of the piston with a valve operative to block flow of hydraulic fluid from the chamber on the rebound side of the piston. Still another form utilizes an elongated endless elastic strap embracing the shock absorbers.

18 Claims, 8 Drawing Sheets

U.S. PATENT DOCUMENTS

| | | |
|---|---|---|
| 4,711,463 | 12/1987 | Knable et al. . |
| 4,736,931 | 4/1988 | Christopherson . |
| 4,756,516 | 7/1988 | Tondato . |
| 4,802,690 | 2/1989 | Raidel ................................. 280/713 |
| 4,828,237 | 5/1989 | Neff . |
| 4,962,916 | 10/1990 | Palinkas . |
| 5,013,063 | 5/1991 | Mitchell ........................... 280/715 X |
| 5,024,301 | 6/1991 | Cook . |
| 5,104,101 | 4/1992 | Anderson et al. . |
| 5,141,697 | 8/1992 | Wydra . |
| 5,171,036 | 12/1992 | Ross . |
| 5,192,057 | 3/1993 | Wydra et al. . |
| 5,215,327 | 6/1993 | Gatter et al. . |
| 5,280,890 | 1/1994 | Wydra . |
| 5,326,083 | 7/1994 | Wydra et al. . |

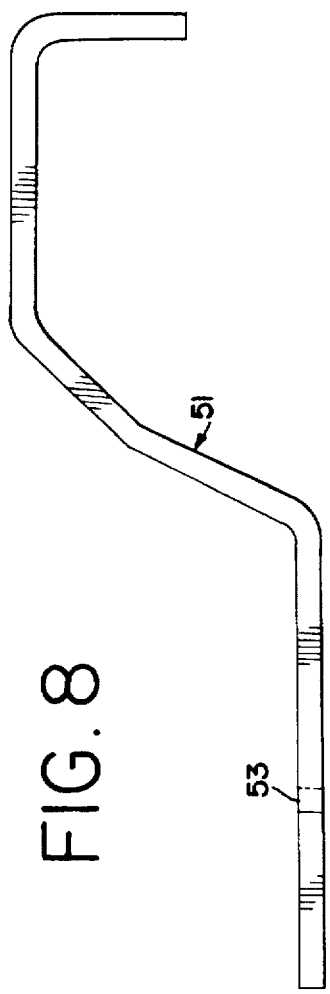
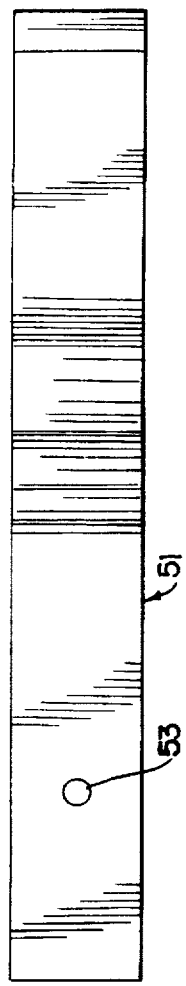
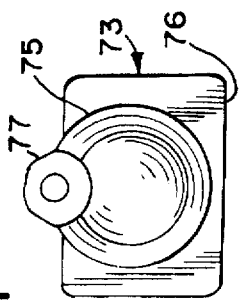
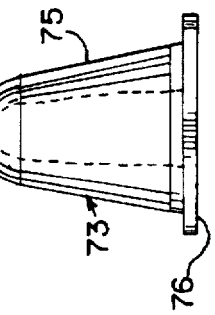
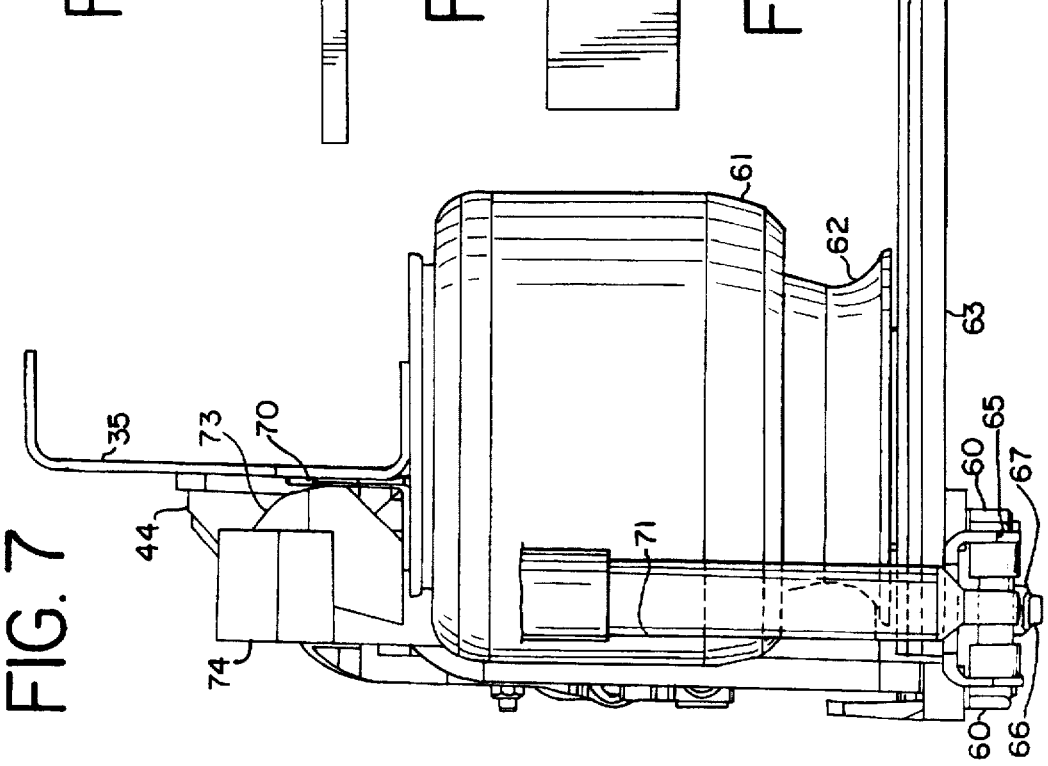

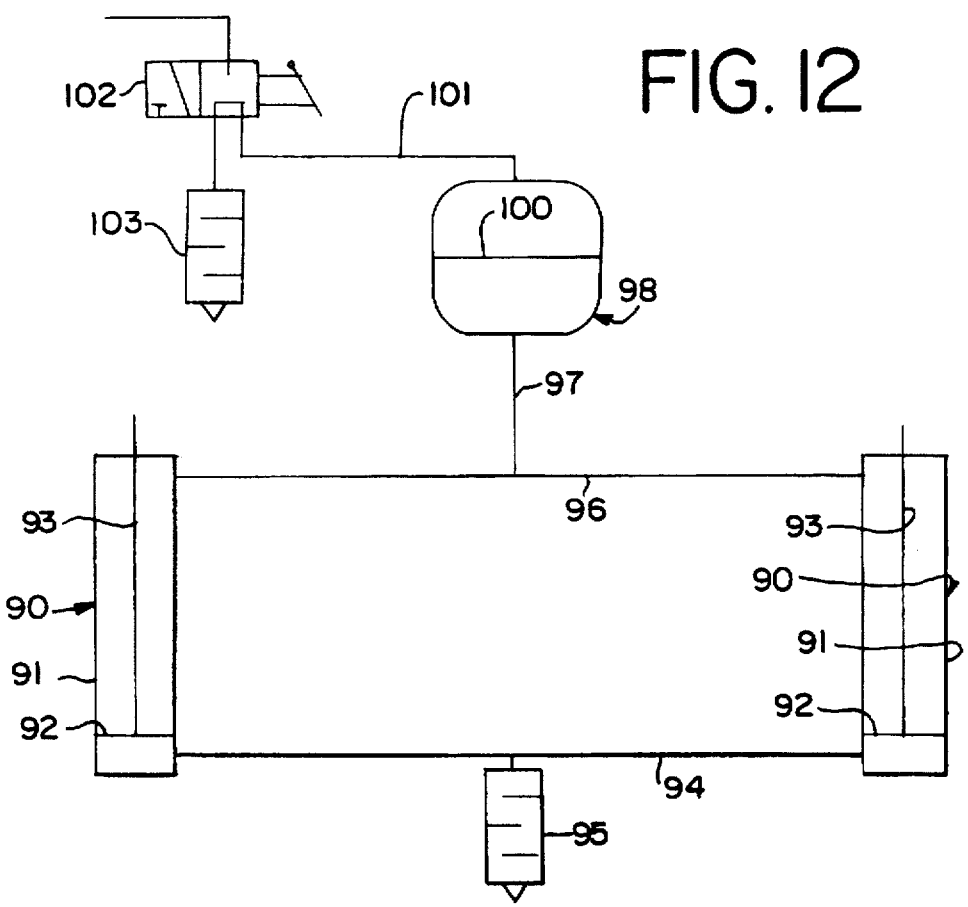
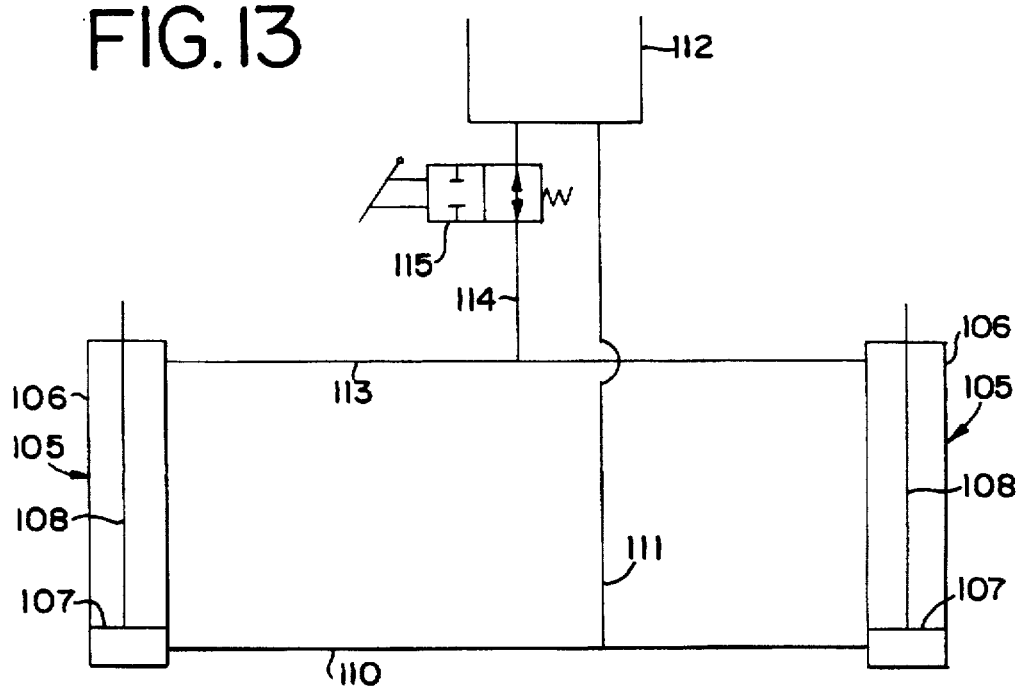

MEANS FOR AND METHOD OF CONTROLLING FRAME RISE IN VEHICLE SUSPENSIONS

BACKGROUND AND DESCRIPTION OF THE INVENTION

This invention relates, generally, to innovations and improvements in vehicle suspensions. More particularly, the invention relates to heavy duty trucks, the frames of which are suspended on torque reactive rear suspensions and subject to driveline vibration and wheel hop due to engine produced torque.

For several reasons, including use of higher horsepower engines and advances in engine technology, there have been increases in the torque output of heavy duty truck engines. Such increases have exacerbated the problems of driveline vibration and wheel hop associated with trailing arm air suspensions which are inherently torque reactive. When increased torque is applied to the drivetrain of a truck equipped with such a torque reactive suspension, such as during acceleration, the frame of the truck rises up and away from the drive axle. This condition is known and referred to in the art as "frame rise".

It has been found that frame rise in vehicles, particularly heavy duty trucks, is generally proportional to the severity of cardan joint induced driveline vibration and wheel hop, and vice versa. Further, it has been found according to this invention that means for and methods of preventing or minimizing frame rise will result in suppressing driveline vibration and wheel hop.

Further, it has been found that frame rise can be suppressed or minimized by the appropriate use of spring means or hydraulic lock means operative between the drive axle of a vehicle and its frame or chassis.

The optimum frame height when driveline vibration is minimal is referred to as "nominal ride height" or "curb height." For maximum improvement frame rise should be suppressed immediately when frame height starts to increase above nominal ride height.

Accordingly, the object of the invention, generally stated, is the provision of practical and economical means for and methods of controllably suppressing frame rise in a vehicle, and in turn, controllably suppressing driveline vibration and wheel hop therein due to engine produced torque in a torque reactive suspension with which the vehicle is equipped.

An important object of the invention is to incorporate a spring or hydraulic lock structure in a torque reactive suspension of a truck or other vehicle which will be operative between the drive axle and vehicle frame to suppress or minimize frame rise and, in turn, controllably suppress driveline vibration and wheel hop due to engine produced torque.

A further object of the invention is to provide such spring structure in the form of a rebound spring incorporated in a shock absorber, a rebound leaf spring, a shock strap and a hydro-pneumatic spring.

A further object of the invention is to provide such hydraulic lock structure in the form of a hydraulic cylinder with lock out valve.

Another object of the invention is the provision of methods of suppressing driveline vibration and wheel hop in a vehicle, particularly a heavy duty truck, having a torque reactive suspension by suppressing or minimizing frame rise during operation of the vehicle immediately upon departure from nominal ride height or curb height.

For a more complete understanding of the nature and scope of the invention, reference may now be had to the following detailed description of embodiments thereof taken in conjunction with the appended claims and accompanying drawings wherein:

BRIEF DESCRIPTION OF THE DRAWINGS

FIG. 7 is an end elevational view taken on line 6—6 of FIG. 5;

FIG. 8 is a side elevational view of a rebound spring which forms a part of the suspension of FIG. 5;

FIG. 9 is a top plan view of the rebound spring shown in FIG. 8;

FIG. 10 is a side elevational view of the rubber stopper which forms a part of the suspension shown in FIG. 5;

FIG. 11 is a top plan view of the rubber stop shown in FIG. 10;

FIG. 12 is a diagrammatic view of a hydro-pneumatic spring embodiment of the invention;

FIG. 13 is a diagrammatic view of a hydraulic lock embodiment of the invention.

DETAILED DESCRIPTION OF PREFERRED EMBODIMENTS OF THE INVENTION

Figure 1:
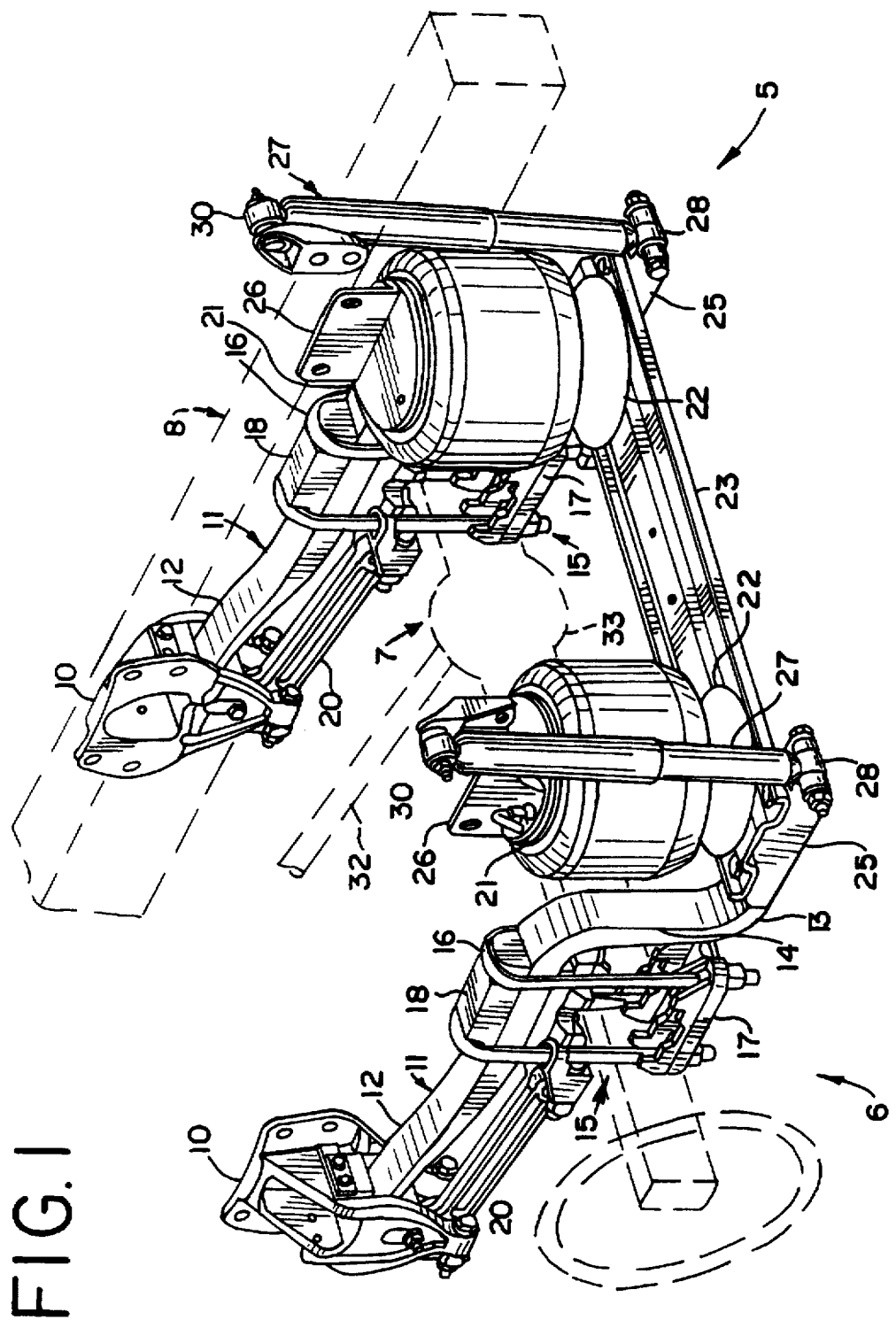
FIG. 1 is an isometric view of a trailing arm torque reactive heavy duty truck suspension incorporating the invention with the frame side beams, the ground wheel on one side and drive axle shown in phantom.
Figure 2:
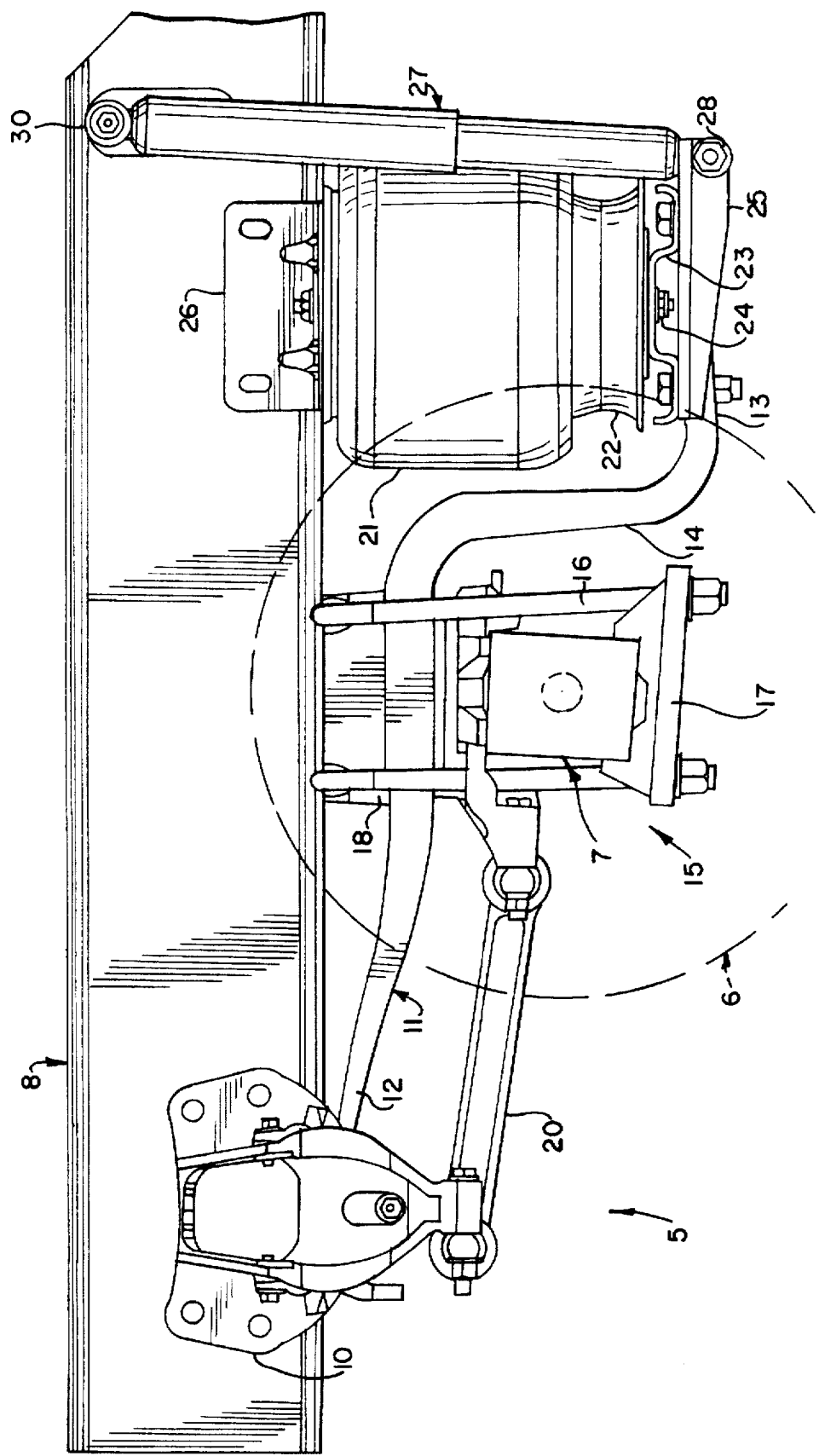
FIG. 2 is a side elevational view, partly broken away, of the suspension shown in FIG. 1.

Referring to FIGS. 1 and 2, a trailing arm torque reactive suspension is indicated generally at 5 which supports the rear of a vehicle, such as a heavy duty truck on ground wheels indicated generally at 6 mounted on opposite ends of a drive axle indicated generally at 7. As used herein "drive axle" designates both the drive axle proper and the drive axle housing. The components of the suspension 5 on opposite sides of the vehicle are the same. The frame or chassis of the vehicle is represented by the fore-and-aft frame members 8.

Mounting brackets 10—10 are suitably mounted on the outer sides of the side beams 8 so as to receive and support the front ends of the gooseneck shaped main support members 11—11 which may be referred to as "Z beams." Each support member 11 has a generally horizontal leading portion 12 and a generally horizontal trailing portion 13. The leading and trailing portions of the main support members 11 are integrally interconnected by a generally vertical portion 14.

The main support members 11 are mounted on the opposite ends of the drive axle 7 by means of a conventional axle attachment assembly indicated generally at 15. The assemblies 15 comprise the usual inverted U or shackle bolts 16 bottom plate 17 and spacer block 18. A torque rod 20 is connected at its forward end to the bottom of the frame bracket 10 and at its rear to the axle attachment assemblies 15.

On each side of the suspension 5 an air spring 21 of known type is bolted at its base 22 to a base bracket 23 by means of a nut and bolt assembly 24. The base bracket 23 is in turn bolted at opposite ends to bifurcated plates 25 which are mounted on the trailing end portions of the main support members 11. The top of each air spring 21 is attached to the adjacent side frame member 8 by means of a bracket 26.

It will be seen that the vehicle chassis as represented by the side frame members 8 is resiliently supported on the drive axle 7 and the ground wheels 6 by the main support member 11 coacting with the brackets 10 and the air springs 21. Conventionally, shock absorbers are used to dampen the rise and fall of the chassis or frame of the vehicle with respect to the ground wheels 6 due to pavement and road irregularities. In the construction shown in FIGS. 1 and 2, shock absorbers are indicated generally at 27 which are pivotally connected at their lower ends at 28 to the bifurcated plates 25 and pivotally connected at their top ends to the respective side frame members 8 at 30. The shock absorbers 27 utilized in the suspensions 5 are of special construction in that they include internal springs 31 which serve to suppress or eliminate frame rise of the vehicle body or chassis with respect to ground wheels 6 and drive axle 7. The special shock absorbers 27 with the internal springs 31 are shown in greater detail in FIG. 4.

Referring to FIG. 1, the drive shaft of the vehicle is indicated diagrammatically in broken line at 32 extending into the differential housing indicated at 33. As is well understood, the drive shaft 32 is connected with the engine of the vehicle in known manner. The drive shaft 32 and the additional connections by which it receives power from the engine are referred to as the "driveline" of the vehicle.

Figure 3:
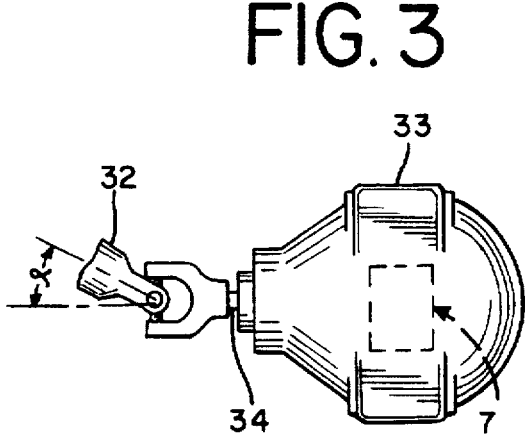
FIG. 3 is a side elevational view of the differential and drive shaft of FIG. 1.

Referring to FIG. 3, the angle α which the drive shaft 32 makes with the differential input shaft 34, has an optimum value at which driveline vibration is reduced to a minimum. As there is relative movement between the suspension 5 in FIG. 1 and the chassis or frame of the vehicle, the suspension pivots proximate to the connection between the leading end of the main support members 11 and the mounting brackets 10. When there is an increase in power transmitted through the drive shaft 32 into the differential 33, which is part of the drive axle 7, there is a tendency for the drive axle 7 to rotate clockwise as viewed in FIG. 2 and in turn, cause the suspension to likewise rotate clockwise and cause the frame or chassis to rise relative to the drive axle. This relative rotation or pivoting of the suspension, called torque reaction, and the resulting frame rise, changes the pitch of both the drive shaft 32 and the differential input shaft 34 in FIG. 3 which causes the angle α between them to change. When this occurs, there is a proportional increase in driveline vibration. Thus, the greater the frame rise, the greater the increase in driveline vibration.

If conditions exist such that the drive wheels periodically slip and then regain traction with the road surface, there is a fluctuation in the torque applied to the suspension. This results in fluctuations in the amount of frame rise which causes the frame to in effect bounce on the suspension. This bouncing of the frame in turn causes the wheels of the vehicle to bounce on the road surface. This undesirable condition is known as "wheel hop."

If frame rise is prevented or at least minimized driveline vibration and wheel hop will, in turn, be minimized if not eliminated. Thus, the optimal frame height occurs when driveline vibration is minimal and this optimal frame height is referred to as "nominal ride height" or "curb height". Shock absorbers 27 with internal springs or buffers serve to controllably minimize or suppress frame rise. The control is most effective if it is initiated as soon as frame rise starts.

Figure 4:
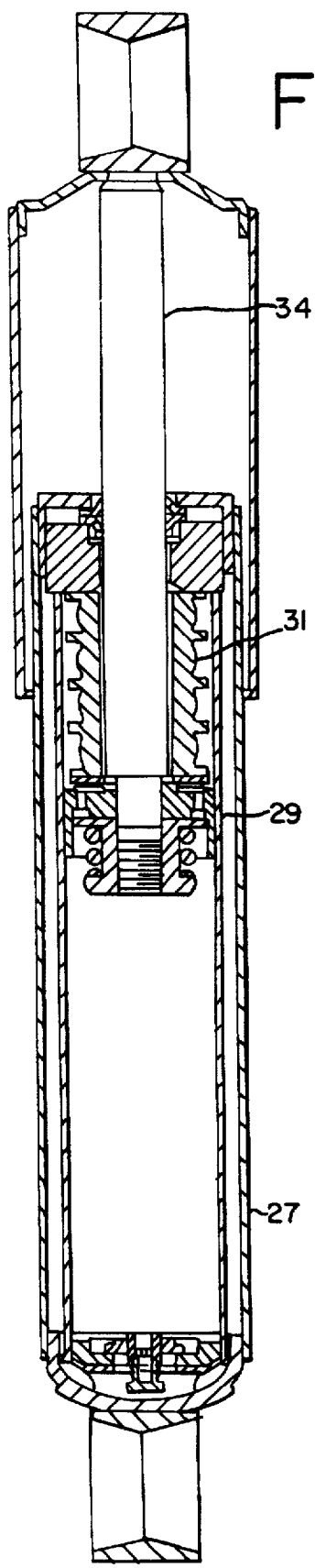
FIG. 4 is an enlarged vertical sectional view of the shock absorber with an incorporated spring shown in FIGS. 1 and 2.

Referring now to FIG. 4, the shock absorber 27 may be of a known commercial tubular hydraulic type which has been modified to incorporate an elastomeric spring or buffer 31 which is in the form of a sleeve mounted on the piston rod 34. If desired, the elastomeric sleeve 31 may be replaced by a spring formed of steel. The shock absorber 27 may, for example, be a Monroe Super Valve 1¾ shock or equal which has been modified to incorporate the spring 31.

As shown in FIG. 4, the component parts of the shock absorber 27 are in the relative positions which they occupy when the suspension is in its nominal ride height or curb height condition. The shock absorber 27 operates in its normal manner when the associated vehicle encounters a road or pavement irregularity. However, on rebound, since the lower end of the spring 31 is in close proximity to the piston assembly 29 the spring 31 becomes immediately functional and acts to prevent frame rise. One form of the spring 31 is disclosed in U.S. Pat. No. 5,104,101 granted on Apr. 14, 1992 to David G. Anderson and Hente Braam and assigned to Miner Enterprises, Inc. The disclosure of this patent is incorporated by reference herein.

Reference may now be had to FIGS. 5–11 for a description of the second embodiment of the invention.

Figure 5:
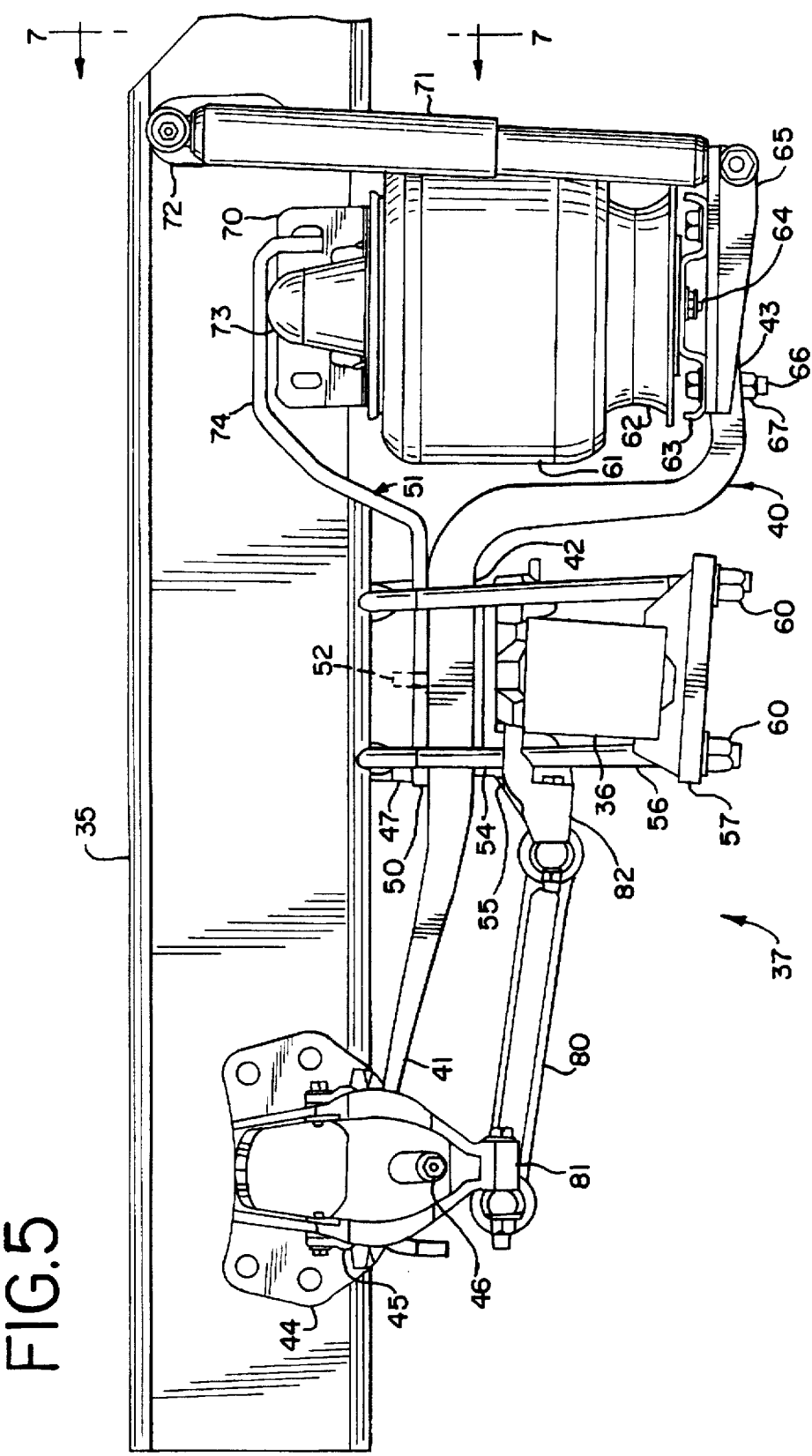
FIG. 5 is a side elevational view of a trailing arm torque reactive heavy duty truck suspension incorporating a second embodiment of the invention.

In FIG. 5 a portion of the left hand side beam of the frame 35 is shown attached to a drive axle 36 by the trailing arm air suspension of this invention which is indicated generally at 37.

Figure 6:
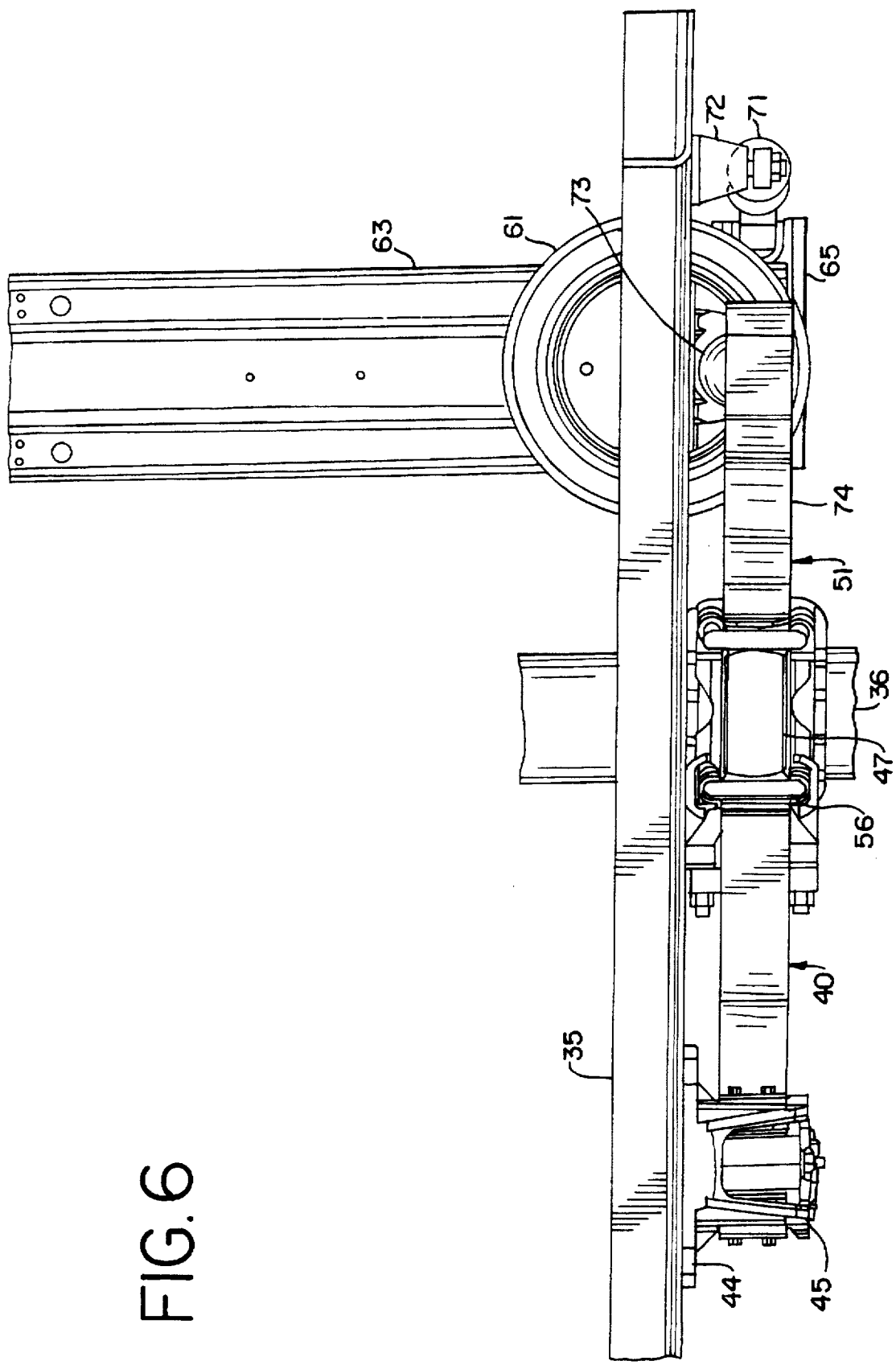
FIG. 6 is a top plan view of the suspension shown in FIG. 5.

A main support member, indicated generally at 40, has a leading upper end 41, a middle portion 42 and a trailing lower end 43. The leading end 41 is attached to the side beam in a known manner by a bracket 44 as shown in FIGS. 5 and 6. As shown in FIG. 5, the leading end 41 of the main support member is supported within bracket 44 between pad 45 and rebound roller 46.

A top pad 47 sandwiches and clamps the leading end 50 of the rebound leaf spring, indicated generally at 51, between it and the top of the main support member middle portion 42, as shown in FIG. 5. A cylindrical dowl 52 mounted on the top of the middle portion 42 of the main support member runs up through the rebound spring leading end 50 and into the top pad 47. The hole 53 shown in FIGS. 8 and 9 accommodates the cylindrical dowl. FIG. 5 shows that a spacer 54 and axle seat 55 are sandwiched between the top of drive axle 36 and the bottom side of the main support member middle portion 42. The entire assembly is held together by a pair of inverted U-bolts 56 with their bent portions passing over the top pad 47 and clamping with axle bottom plate 57 up against the drive axle 36. Self-locking nuts 60 are provided on the threaded ends of the U-bolts.

An air spring 61 of known type is bolted at its base 62 to base bracket 63 by bolt 64. Base bracket 63 is in turn bolted to bifurcated plate 65 and the main support member trailing end 43 by bolts 66 and locknuts 67 as shown in FIGS. 5 and 7. The top of the air spring 61 is attached to the frame 35 by bracket 70, as shown in FIGS. 5 and 7. As shown in FIG. 5, shock absorber 71 of known commercial type is pivotally connected at its lower end to bifurcated plate 65 and at its upper end to frame 35 by bracket 72.

Elastomeric stop 73, as shown in FIGS. 5, 6 and 7, is mounted on the bracket 70 so as to engage the underside of trailing end 74 of the rebound spring 51 when the axle 36, and thus the main support member middle portion 42, rotate clockwise as viewed in FIG. 5, away from the frame 35 as a result of engine torque applied to the drive shaft and the drive axle 36 or when frame rise occurs. FIGS. 8 and 9 show details and the configuration of the goosenecked rebound spring 51. FIGS. 10 and 11 show details of the rubber stop 73 as comprising a hollow molded elastomeric body 75 mounted on a bottom plate 76 having an apertured attaching tab 77.

As shown in FIG. 5, the leading end of torque rod 80 is attached to the frame 35 by a downwardly extending yoke arm 81 on bracket 44 while its trailing end is attached to a yoke arm 82 on axle seat 55. This arrangement provides resistance to the drive axle 36 rotating in the clockwise direction in response to the drive wheels moving in the counterclockwise direction as viewed in FIG. 5.

In FIG. 12 a third embodiment of the invention is shown diagrammatically which can be incorporated in the suspension shown in FIG. 1 in place of the shock absorbers 27—27. In FIG. 12 hydraulic cylinders are indicated at 90—90 comprising a casing 91, a piston 92 and a piston rod 93. Underneath the pistons 92 the hydraulic cylinders 90 are vented to atmosphere and, above the pistons 92, are charged with oil or other hydraulic fluid. The air chambers are interconnected by a line 94 which is provided with a vent to atmosphere 95. The hydraulic chambers are interconnected with a line 96 which is in turn connected by line 97 with an accumulator 98 of known commercial type which forms a hydro-pneumatic spring. The air and oil compartments of the accumulator 98 are separated by a diaphragm 100 air pressure is applied to the diaphragm 100 from the truck air supply through a line 101 connected with a valve indicated at 102. The valve 102 operates to adjust the supply air to the accumulator 98 only when frame rise occurs due to engine torque. The accumulator 98 is connected with a vent 103. The hydraulic cylinders 90 in the system shown in FIG. 12 operate to provide a form of hydraulic resistance when frame rise is initiated due to engine torque.

Referring to FIG. 13, a fourth embodiment of the invention is shown diagrammatically therein which can be incorporated in the suspension shown in FIG. 1 in place of the shock absorbers 27—27. In FIG. 13 hydraulic cylinders are indicated generally at 105 comprising a casing 106, a piston 107 and a piston rod 108. Underneath the pistons 107, the hydraulic cylinders 105 are charged with oil or other hydraulic fluid from a common line 110 which is connected by a line 111 to the oil reservoir for the system 112. Above the pistons 107 the hydraulic cylinders 105 are also charged with oil or other hydraulic fluid from a common line 113 which is connected by a line 114 to the reservoir 112. A two-way valve 115 of known commercial type is located in the line 114. The valve 115 is adjusted to block oil flow when frame rise occurs due to engine torque. In operation, the hydraulic cylinders 105 provide a form of hydraulic lock providing rebound control immediately upon departure from nominal ride height.

Figure 14:
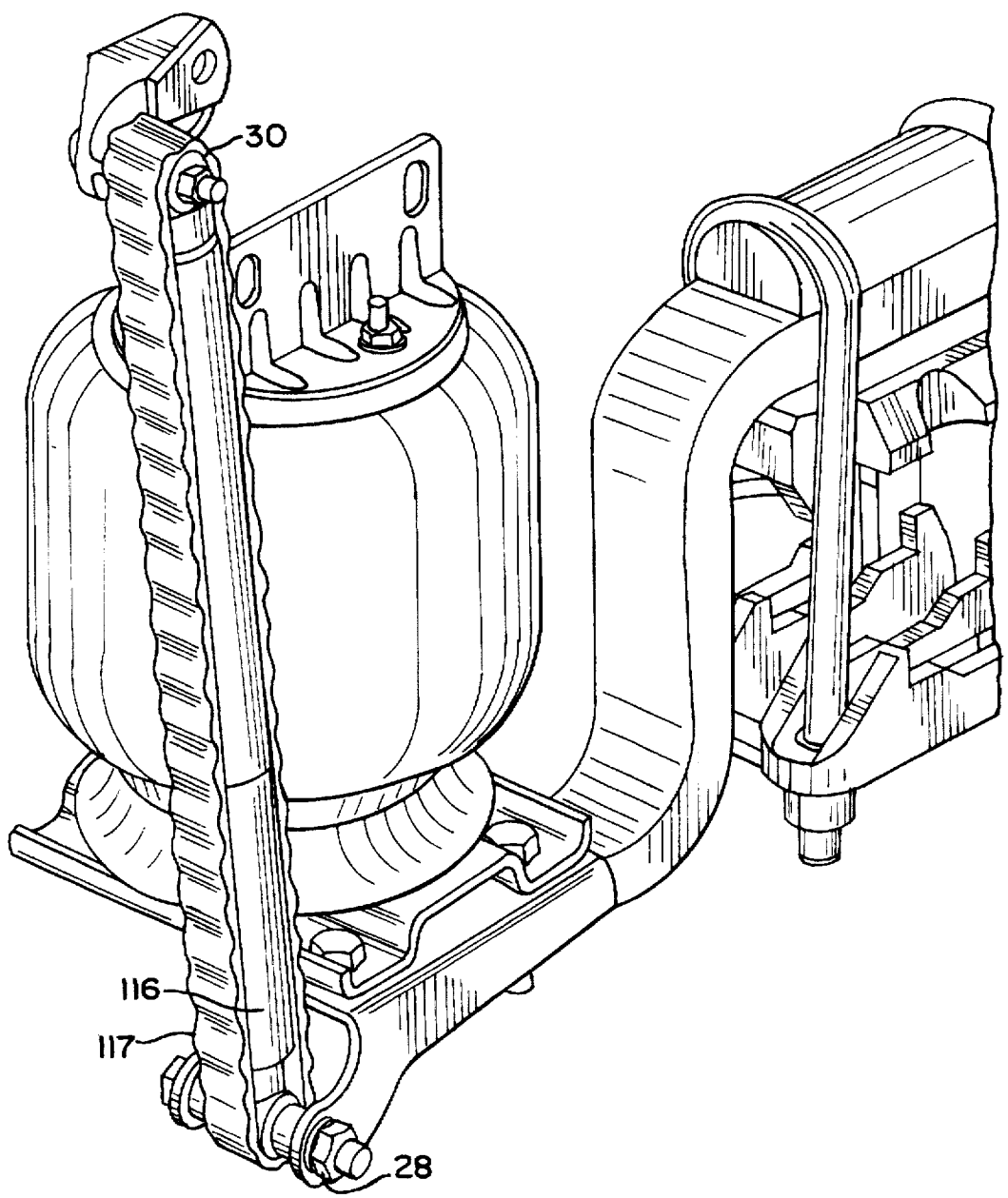
FIG. 14 is an isometric view of a part of the suspension 5 of FIG. 1 wherein the shock absorbers are equipped with endless elastic straps.

In FIG. 14 a fifth embodiment of the invention is shown wherein the shock absorbers 27—27 are replaced with commercial shock absorbers 116 of known commercial type and endless elongated elastic straps 117 are looped in taught or snug condition over the pivot connections 28 and 30. The straps 117 may be formed of a composite of nylon, or other inelastic cord material, and elastic material. They function to prevent or suppress frame rise from occurring, acting immediately upon departure from nominal ride height.

Having described the invention generally in detail in connection with the drawings, including presently preferred embodiments thereof, those skilled in the art will be able to practice the invention either according to the embodiments disclosed or according to other embodiments without departing from the spirit and scope of the appended claims.

What is claimed is:

1. In a vehicle having a frame supported at least in part on ground wheels by a torque reactive suspension incorporating a drive axle operatively connected to said ground wheels, driveline means connected in power transmitting relationship between the vehicle engine and said drive axle and shock absorber means operatively interconnected between said frame and said drive axle, the improvement comprising frame rise control means operative between said drive axle and said vehicle frame which functions in rebound to limit frame rise due to engine torque and thereby suppresses driveline vibration and wheel hop due to engine produced torque.

2. The improvement called for in claim 1 wherein said frame rise control means is in the form of spring means.

3. In the vehicle called for in claim 1 wherein said suspension is a trailing arm torque reactive suspension.

4. The improvement of claim 1 wherein said frame rise control means functions in rebound immediately upon departure from nominal ride height for said vehicle.

5. In a vehicle as called for in claim 1 said suspension additionally incorporating on each lateral side thereof:
 a) a fore-and-aft extending main support member in the form of a leaf spring having an upper end, a lower end, an integral intermediate section having a generally horizontal portion extending from said upper end and a generally vertical portion extending upwardly from said lower end,
 b) means for attaching the distal end of said upper end in supporting relationship with said vehicle frame,
 c) an upstanding air spring mounted on said lower end,
 d) means for attaching the top of said air spring in supporting relationship with said vehicle frame, and
 e) means for clamping the adjacent end of said drive axle to said generally horizontal portion of said intermediate section; and
 wherein said frame rise control means comprises a shock absorber incorporating therein a spring mounted on a piston rod and which functions in rebound immediately upon departure from nominal ride height for said vehicle.

6. In the vehicle called for in claim 5, said suspension is a trailing arm torque reactive suspension and said upper end of the main support member is the leading end and said lower end is the trailing end.

7. In the vehicle called for in claim 5, said spring is an elastomeric sleeve.

8. In the vehicle called for in claim 5, said spring is a steel compression spring.

9. In a vehicle as called for in claim 1, said suspension additionally incorporating on each lateral side thereof:
 a) a fore-and-aft extending main support member in the form of a leaf spring having an upper end, a lower end, and an integral intermediate section having a generally horizontal portion extending from said upper end and a generally vertical portion extending upwardly from said lower end,
 b) means for attaching the distal end of said upper end in supporting relationship with said vehicle frame,
 c) an upstanding air spring mounted on said lower end, d) means for attaching the top of said air spring in supporting relationship with said vehicle frame, and e) means for clamping the adjacent end of said drive axle to said generally horizontal portion of said intermediate section; and wherein said frame rise control means comprises a rebound control leaf spring having one end clamped onto said generally horizontal portion of said intermediate section by said axle clamping means, and having an opposite end extending in spaced relationship over the top of a stop attached to the frame in position to have engagement with the underside of said opposite end of said rebound control leaf spring in supporting relationship therewith during rebound conditions.

10. In the vehicle of claim 9, wherein said suspension is a trailing arm torque reactive suspension and said upper end of the main support member is the leading end and said lower end is the trailing end.

11. In the vehicle called for in claim 9, wherein said rebound control leaf spring is gooseneck shaped and said one end is a leading lower end and said opposite end is an upper trailing end.

12. In a vehicle as called for in claim 1, said suspension additionally incorporating on each lateral side thereof:

a) a fore-and-aft extending main support member in the form of a leaf spring having an upper end, a lower end, and an integral intermediate section having a generally horizontal portion extending from said upper end and a generally vertical portion extending upwardly from said lower end, b) means for attaching the distal end of said leading upper end in supporting relationship with said vehicle frame, c) an upstanding air spring mounted on said trailing lower end, d) means for attaching the top of said air spring in supporting relationship with said vehicle frame, and e) means for clamping the adjacent end of said drive axle to said generally horizontal portion of said intermediate section; and wherein said frame rise control means comprises a hydraulic cylinder, a source of pressurized hydraulic fluid connected to the chamber of the hydraulic cylinder on the rebound side of the piston and vented air on the opposite side of the piston.

13. In the vehicle called for in claim 12, wherein said suspension is a trailing arm torque reactive suspension and said upper end of the main support member is the leading end and said lower end is the trailing end.

14. In a vehicle as called for in claim 1, said suspension additionally incorporating on each lateral side thereof:

a) a fore-and-aft extending main support member in the form of a leaf spring having an upper end, a lower end, and an integral intermediate section having a generally horizontal portion extending from said leading upper end and a generally vertical portion extending upwardly from said lower end, b) means for attaching the distal end of said upper end in supporting relationship with said vehicle frame, c) an upstanding air spring mounted on said lower end, d) means for attaching the top of said air spring in supporting relationship with said vehicle frame, and e) means for clamping the adjacent end of said drive axle to said generally horizontal portion of said intermediate section; and wherein said frame rise control means comprises a hydraulic cylinder, a source of hydraulic fluid connected to the chambers of the hydraulic cylinder on both sides of the piston, and valve means which operates to block flow of hydraulic fluid from the chamber on the rebound side of said piston when frame rise occurs due to engine torque.

15. In the vehicle called for in claim 14, wherein said suspension is a trailing arm torque reactive suspension and said upper end of the main support member is the leading end and said lower end is the trailing end.

16. In a vehicle as called for in claim 1, said suspension additionally incorporating on each lateral side thereof:

a) a fore-and-aft extending main support member in the form of a leaf spring having an upper end, a lower end, and an integral intermediate section having a generally horizontal portion extending from said upper end and a generally vertical portion extending upwardly from said lower end, b) means for attaching the distal end of said leading upper end in supporting relationship with said vehicle frame, c) an upstanding air spring mounted on said trailing lower end, d) means for attaching the top of said air spring in supporting relationship with said vehicle frame, and e) means for clamping the adjacent end of said drive axle to said generally horizontal portion of said intermediate section; and wherein said frame rise control means comprises an elongated endless elastic strap.

17. In the vehicle called for in claim 16, wherein said suspension is a trailing arm torque reactive suspension and said upper end of the main support member is the leading end and said lower end is the trailing end.

18. A method of suppressing driveline vibration and wheel hop in a vehicle having a frame supported in part on ground wheels by a torque reactive suspension incorporating a drive axle operatively connected to said ground wheels, and driveline means connected in power transmitting relationship between the vehicle engine and said drive axle wherein said suspension incorporates a pair of shock absorbers, one on each side of the vehicle, and a step of minimizing frame rise is accomplished by positioning an elastomeric sleeve on the piston rod of each said shock absorber so as to resist rebound.

* * * * *